Oct. 12, 1965 R. L. THORNE 3,211,964

ACTUATOR POWER SUPPLY

Filed April 5, 1963 2 Sheets-Sheet 1

INVENTOR.
ROBERT L. THORNE

BY Robert G. Clay

ATTORNEY

Oct. 12, 1965 R. L. THORNE 3,211,964

ACTUATOR POWER SUPPLY

Filed April 5, 1963 2 Sheets-Sheet 2

INVENTOR.
ROBERT L. THORNE

BY Robert G. Clay
ATTORNEY

United States Patent Office 3,211,964

Patented Oct. 12, 1965

3,211,964
ACTUATOR POWER SUPPLY

Robert L. Thorne, Woodland Hills, Calif., assignor to Ampex Corporation, Redwood City, Calif., a corporation of California Filed Apr. 5, 1963, Ser. No. 270,852
7 Claims. (Cl. 317—151)

This invention relates to tape transport systems, and more particularly to improve power supply circuits for actuator systems useful in the control of tape movement.

In contrast to some tape transport systems operating continuously at relatively low speeds, certain high performance systems used with digital data processors must now provide a number of different operating modes. These tape transports, usually but not necessarily used with magnetic tape, are required to operate bidirectionally and intermittently as determined by the needs of the data processor. Accordingly, the tape may be run full speed in one direction, stopped and immediately run full speed in the other direction.

In order to minimize the time required for tape starting and stopping, so that less time is lost during these mode changes, high performance drive systems have been developed and are now in wide use. Usually, these systems employ a pair of oppositely rotating drive capstans, each being positioned on a different side of the transducer assembly along the tape path. The tape can be driven in a selected direction merely by actuating an associated pinch roller mechanism, which urges the tape against the selected capstan. Such mechanisms are designed to operate to bring the tape up to a selected nominal velocity within milliseconds and have accordingly found wide use.

To satisfy the speed requirements of a high performance system, certain pinch roller actuator systems have been devised to quickly move the associated pinch roller to and from engagement with the associated capstan drive roller. One form of pinch roller actuator system contains a bistable magnetic device having a pair of different magnetic flux paths which are completed in accordance with the position of a central, movable actuator armature or vane. "On" and "off" signals are applied to windings of the actuators, to place the actuator vane in a selected stable position in which it is held magnetically. The shift of the actuator vane from one stable position to the other changes the pinch roller position because an arm supporting the pinch roller and the vane are mounted on a common shaft. The arm is thus rotated to move the pinch roller into and out of engagement with the capstan drive roller in accordance with the position of the actuator vane.

The general structure of the pinch roller actuator provides an approximate loop configuration, in the form of an "0," with the two sides of the "0" being of magnetic material and each side having two inwardly protruding pole tips. The top and bottom portions of the "0" are provided by a pair of permanent magnets having identical polarity dispositions that act to hold the central rotatable actuator vane in either of two diagonal positions. When the actuator vane engages either of the two diagonally opposed pole tip pairs extending from the opposite side elements, a low reluctance, shunt magnetic path between the opposite sides of the actuator structure is completed to maintain a closed magnetic flux path until actuated to the opposite stable position. Positive actuation from one stable position to the other is effected by actuating windings disposed on opposite pole tips which receive "on" or "off" current pulses from an external source to overcome the magnetic path already established and attract the moveable vane away from the opposite pole tip by the magnetic force exerted.

The magnetic force exerted by an actuating winding to change the position of the actuator vane must act across the high reluctance air gap, and for this reason the current pulse applied thereto must be considerable. Previous circuit arrangements for providing the large "on" and "off" actuating current pulses employed a capacitor which was charged beforehand and then discharged with the actuating coil to provide the current pulse. However, a large amount of real power was needlessly dissipated in this circuit, and other problems arose at high programming rates caused by a detrimental drop of voltage across the internal impedance of the power supply circuit due to the excessively high charging current needed to recharge the capacitor.

It is therefore an object of the present invention to provide an improved circuit for energizing the pinch roller actuators of tape transport systems.

Another object of this invention is to provide an improved circuit for supplying current pulses to the actuating coils of a pinch roller actuator.

A further object of the present invention is to provide an improved pinch roller actuating system for use at high programming rates with a tape transport.

Actuating systems in accordance with the invention meet these and other objectives by providing a capacitor charging circuit which, when closed, provides current through an inductance connected in series with a unidirectional current device to charge the capacitor. By means of the additional elements, the capacitor is charged to a final voltage twice that of the source while the charging current is limited to a reasonable value. The energy stored in the capacitor can then be discharged through an additional series connected unidirectional device to the actuator coil to provide the magnetic force necessary to switch the position of the actuator vane. In one specific example, silicon controled rectifiers may be employed as the unidirectional devices; moreover by supplying signals to their control electrode, they also perform the function of switching for charging and discharging the capacitor.

A better understanding of the invention may be had by reference to the following description, taken in conjunction with the accompanying drawings, in which.

Figure 1:
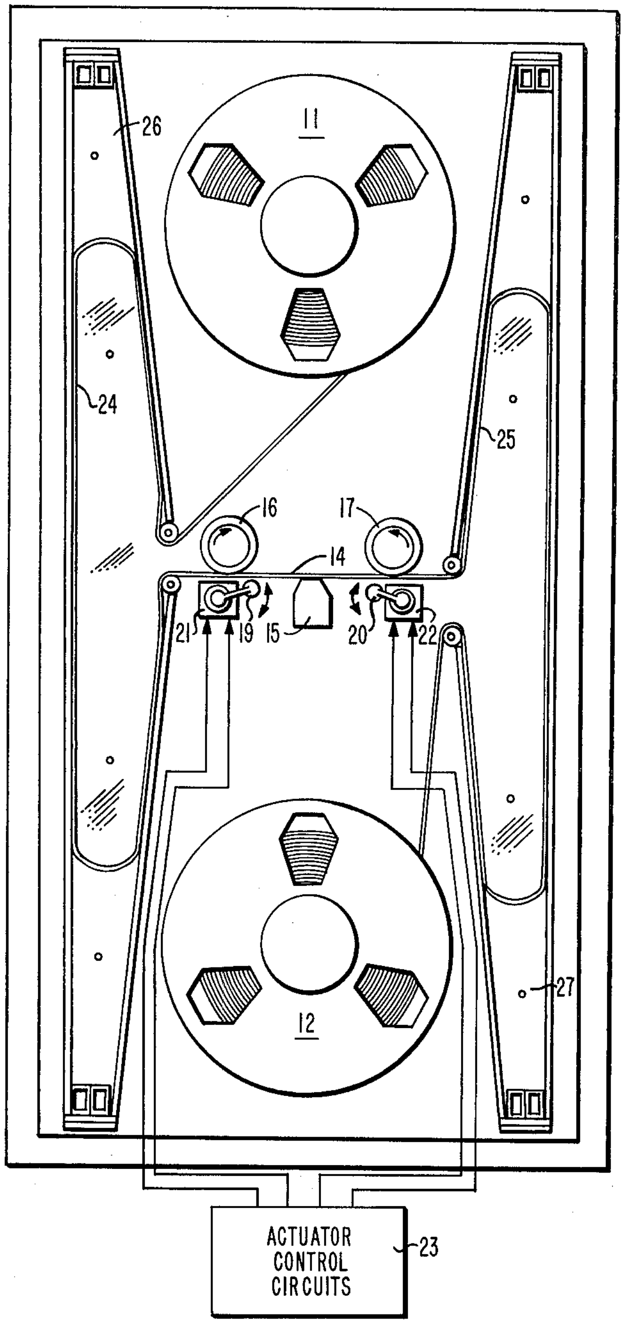
FIGURE 1 is a partial perspective representation of a tape transport system utilizing pinch roller actuator systems in accordance with the invention.

The general organization of a typical tape transport system, such as may employ a pinch roller actuator system to best advantage, is illustrated in FIGURE 1. Details of such a system which are not concerned with the particular aspects of the present invention have been omitted where possible in order to simplify the description, but their use will be understood by those skilled in the art.

As shown in FIGURE 1, a digital tape transport may operate bidirectionally between a tape supply reel 11 and a tape takeup reel 12 to pass a magnetic tape 14 between the two reels 11 and 12 and in either direction across a magnetic head transducer assembly 15, which is substantially symmetrically placed relative to the reels. A pair of oppositely rotating capstans 16 and 17 are positioned on opposite sides of the magnetic head assembly 15 and used to drive the tape in either direction, as determined by external programming from a data processing system or device to which the tape transport is coupled. Pinch rollers 19 and 20 disposed on the opposite side of the tape 14 from each of the capstans 16 and 17 respectively are selectively urged with minimum delay against the respective capstan surface by the action of pinch roller actuators 21 or 22 respectively, thereby moving the tape 14 in the selected direction. Actuator control circuits 23 are coupled to provide the desired "on" and "off" signals to the separate actuators 21 and 22 so as to control forward and reverse movement of the tape 14. The sudden start and stop movements of the tape 14 act only against low inertia tape loops 24 and 25 provided by vacuum chambers 26 and 27, which are disposed between each of the rotating capstans 16 and 17 and the associated reels 11 and 12. Other forms of low inertia compliance means, such as multiple loop tension arms (not shown) may be employed separately or in conjunction with the vacuum chambers 26 and 27 in order to permit the high speed changes of tape movement at the head assembly 15 without requiring a comparable movement at the reels 11 and 12.

The actuator system for each pinch roller, for example, is normally in the form of a bistable magnetic device having a pair of different magnetic flux paths which are completed in accordance with the position of a central, movable actuator armature or vane. A shaft connects the actuator vane to an arm holding the respective pinch roller 19 or 20. The "on" and "off" signals applied to each of the actuators 21 and 22 switch the actuator vane along with the coupled pinch roller to the selected position in which it is then held magnetically.

Figures 2, 3, 5:
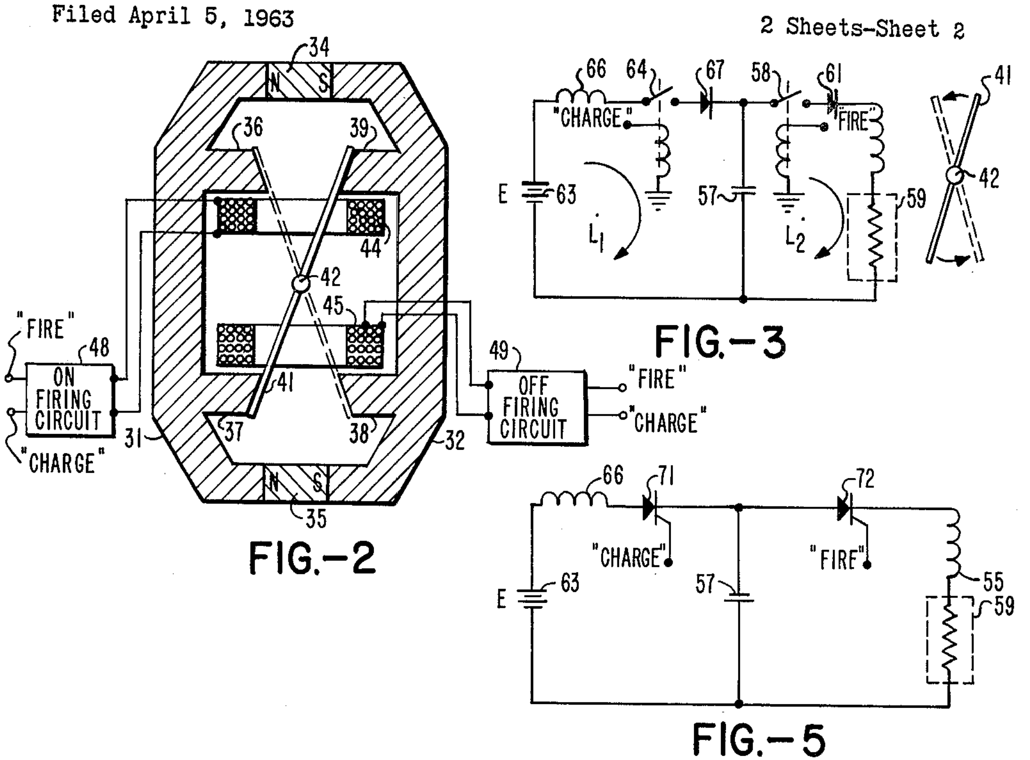
FIGURE 2 is a combined block diagram and enlarged sectional view of a pinch roller actuator system in accordance with the invention.
FIGURE 3 is a detailed schematic circuit diagram illustrating the basic principles of a pinch roller actuator system in accordance with the invention.
FIGURE 5 is a detailed circuit diagram of a pinch roller actuator system constructed in accordance with the invention and utilizing electronic switches.

As shown in FIGURE 2, the details of construction of one form of actuator element contemplated by this invention are similar in many respect to those well known in the art, which are arranged to provide the desired bistable magnetic characteristics. That is, the general structure provides an approximate loop configuration, in the form of an "0," with two sides 31 and 32 of the "0" being of a magnetic material and being joined at their top and bottom portions by a pair of permanent magnets 34 and 35 having identical polarity dispositions. Each of the two sides 31 and 32 have a pair of inwardly protruding pole tips 36, 37 and 38, 39. The central rotatable actuator vane 41, carried by or forming a part of a rotatable actuator shaft 42 to which is coupled the associated pinch roller and its supporting arm, is mounted centrally within the actuator. The actuator vane 41 can rotate to assume either of two diagonal positions in which it engages the diagonally opposed pole tip pairs 36, 38 or 37, 39 extending from the opposite side elements. In either diagonal position, the actuator vane 41 provides a low reluctance shunt magnetic path between the opposite sides 31 and 32 of the actuator structure, and thus completes and maintains this magnetic flux path closed until positively actuated to the opposite stable position.

Each of a pair of actuator windings 44 and 45 is disposed about the vane 41 on a different side of its pivot point. With the actuator vane 41 in one of the two stable diagonal positions, actuation to the other stable position is effected by supplying a current pulse of sufficient amplitude and appropriate polarity to the coil 44 or 45 from the appropriate "on" or "off" firing circuit 48 or 49 respectively. The magnetic flux established by the current flow through the coil magnetizes the vane 41 in a sense, such that there is mutual repulsion between the ends of the vane 41 and the pole tips with which they were initially in contact. The vane is forcefully attracted to the opposite pole tips, rotating to its other diagonal position where the other stable magnetic flux path is established.

The "on" and "off" firing circuits 48 and 49 are coupled to provide a current pulse of sufficient amplitude to their appropriate actuating coils 44 and 45 upon receipt of a "fire" command from the external programming circuitry. Supplying a current pulse of the magnitude required directly from a power source is inadvisable since the momentary rush of current needed for this single operation normally greatly exceeds the operating needs of the remainder of the system elements. However, a large capacitor may be used as a source of these current pulses so that when the "fire" command is received, the firing circuit 48 or 49 acts to discharge the capacitor through the respective coil 44 or 45.

As shown in FIGURE 3, a pinch roller actuator firing circuit may be constructed according to the invention to avoid excessively high storage capacitor charging current, and further prevent detrimental voltage drops in the power supply at high programming rate due to excessive real power dissipation. The basic circuit for supplying the current pulse to energize an actuating winding 55 of an actuator (shown herein in simplified form) to one of its two positions consists of a storage capacitor 57 and a switch 58, which may be solenoid actuated to close on command to discharge the capacitor 57 through the actuator coil 55. As the switch 58 is closed, the energy stored as a voltage across the capaictor 57 is transferred as an increase in current flow through the inductance of the coil 55. A resistor 59 is included in series with the coil 55 as representative of the power dissipated in moving the actuator vane 41 from one position to the other. The combination of the capacitor 57 and the induction of the coil 55 alone would form an oscillatory circuit in which energy would be transferred back and forth between the two until the stored energy is completely consumed in the power dissipating element 59. To prevent needless power dissipation after the first pulse of current needed for actuation, a unidirectional device such as the diode 61 is included in series with coil 55 to prevent any reversal of current flow that would transfer energy back to the discharged capacitor 57.

The energy required to initially charge the capacitor 57 prior to discharge is obtained from a D.C. power source 63 by closing the contacts of the serially connected switch 64. The capacitor 57 is charged by a current flowing through a path including the source 63, the closed switch 64, an inductive element 66 and a unidirectional device 67. A series connection of the inductive element 66 with the uncharged capacitor 57 and without the unidirectional device 67 would produce an oscillatory circuit on closure of the switch 64. The inductive element 66 prevents an initial rush of current to the uncharged capacitor 57, and the unidirectional device 67 is included to prevent the oscillatory reversal of current flow once the storage capacitor 57 has reached its maximum potential, which is twice the voltage E of the source 63.

Figure 4:
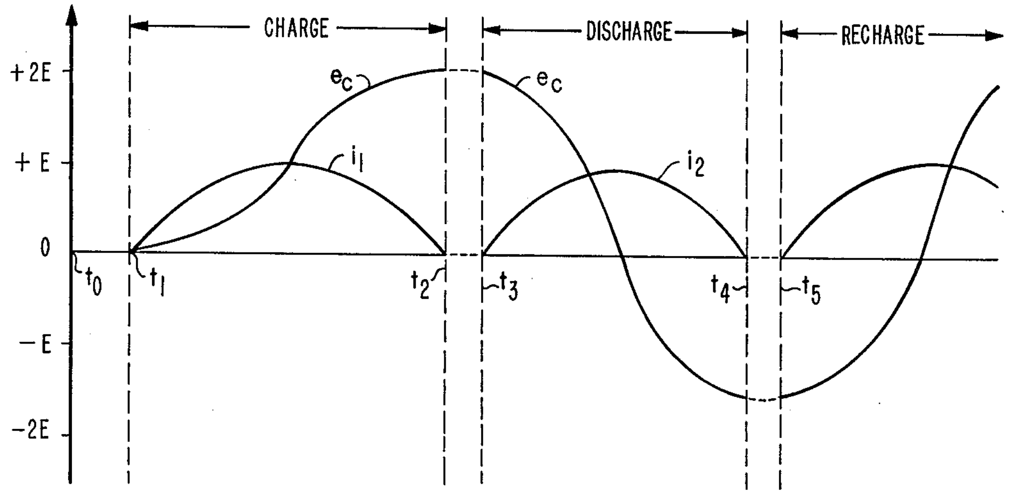
FIGURE 4 is an idealized waveform diagram illustrating the operation of the circuit constructed in accordance with the invention as illustrated in FIGURE 3.

The operation of an actuator system in accordance with this invention as illustrated in FIGURE 3 is best understood by reference to the waveforms of FIGURE 4. Assuming that initially at time $t_0$ the storage capacitor 57 is uncharged, then the voltage $e_c$ across the capacitor is equal to zero. At some later time $t_1$, a "charge" command is received at the input to the actuator firing circuit and the contacts of switch 64 are closed. Immediately a loop current $i_1$ begins to flow in the charging circuit from the voltage sources 63 through the inductance 66, the contacts of switch 64 and the unidirectional device 67 to charge the storage capacitor 57. During the first portion of the charging period, the loop current $i_1$ is prevented from increasing to an excessive value by the inductive impedance provided by the inductance 66. The capacitor 57 continues to charge due to the current sustaining action of the inductance 66 until its voltage has obtained the value of twice the voltage value E of the source 63 at which time the loop current $i_1$ has dropped to zero and is tending to reverse direction.

However, $i_1$ is prevented from reversing direction by the high impedance presented to reverse current flow by the undirectional diode 67. The charging switch 64 can now be opened and the charge represented by $e_c$ which is now equal to 2E is maintained on the storage capacitor 57.

The voltage doubling effect is achieved in accordance with well known principles concerning transient response of an L–C circuit to which a direct voltage is suddenly applied. From the moment a switch is closed to apply a sudden change in voltage to the L–C circuit the current and the voltage on the capacitor oscillate about their final steady state values. Physically the current starts to flow to charge the capacitor. Because of the low impedance of the capacitor to current flow changes as compared with the inductance, the current continues to flow into the capacitor when the magnetic field built up in the inductance begins to collapse. The collapsing field produces an opposite voltage polarity across the inductance, and, consequently, the capacitor voltage over-runs its final value to become higher than the impressed voltage. Without a unidirectional element the condenser would then begin to discharge thereby continuing the oscillatory transfer of energy between the inductance and the capacitor until the excess energy was dissipated by the resistance. To obtain the voltage doubling effect the value of the resistance in the L–C circuit must be kept low to prevent energy dissipation. The phenomenon is analogous to a weight suspended from a spring with a low value of mechanical damping.

Now at some time $t_3$ after the storage capacitor 57 has been charged, a "fire" signal is received by the particular actuator firing circuit and the discharge switch 58 is closed. The storage capacitor 57 having been maintained with a voltage $e_c$ equal to 2E now discharges as the loop current $i_2$ through the switch 58, the unidirectional diode 61, the actuating coil 55 and through the resistor 59 which is here used to simulate power dissipation. From the waveform $e_c$, it is seen that the voltage across the capacitor 57 during discharge has the form of a damped sinusoid as does the loop current $i_2$. If there were no energy dissipating element, such as the resistor 59, then $e_c$ would continue to change until it reached a negative voltage of —2E at the peak of its negative half cycle. As soon as the loop current $i_2$ tries to go negative at time $t_4$, the unidirectional diode 61 cuts off thereby stopping any further loop current flow and leaving a negative voltage across the storage capacitor 57. The "charge" command received by the firing circuit at time $t_5$ results in the storage capacitor 57 recharging as before, except that this time it starts from an initial negative $e_c$ voltage level.

In FIGURE 5, the functions of both the switch and the unidirectional diode may be accomplished by use of silicon-controlled rectifiers 71 and 72, or other thyratron type devices. The silicon-controlled rectifier is effectively a solid state thyratron having cathode, anode and control electrodes, being capable of passing current only in a single direction between the cathode and anode electrodes upon receipt of a signal upon its control electrode of sufficient strength to cause firing. Once firing of the silicon-controlled rectifier 71 or 72 has been initiated by "charge" or "fire" signals, respectively, the current continues to flow in the forward direction until an attempted reversal of current shuts it off to await another signal on its control electrode. The use of silicon-controlled rectifiers is preferred instead of the more conventional switching means and unidirectional devices since the single element has the advantages of low cost, high current flow capacity and solid state construction.

This invention therefore provides a power supply circuit for operating the pinch roller actuators of a magnetic tape system, which, among other things, prevent excessively high capacitive charging current, the dissipation of large amounts of real power, a detrimental power supply drop at high programming rates, and allows the voltage of the power source 63 to be reduced by a factor of two.

It should be noted that the inductive value of the additional inductive element 66 chosen should be related to the capacity value of the storage capacitor 57 such that the resonant frequency of the two is related to the maximum programming rate of the tape transport system. That is, after the storage capacitor 57 has discharged to switch the actuator to one position, a charging signal should be immediately applied to start the recharging cycle. The time required for completion of the recharging cycle depends upon the inductive value of the inductance 66, which should not be so large so as to extend the time for recharging beyond that minimum time at which another "fire" signal can be expected to be received at this same firing circuit. However, within this limitation, the inductance value of the inductive element 66 should be made as large as possible to limit the maximum charging current supplied to the storage capacitor 57.

The "charge" and "fire" signals applied to each of the firing circuits may be provided by individual one-shot multivibrator circuits or any other convenient means. For the conventional one-shot multivibrator circuit, two outputs may be obtained which are essentially complementary, one high while the other is low. When a triggering pulse is applied to the multivibrator, one of the outputs is maintained at a high level for a predetermined period of time determined by the circuit time constants, and then switches back to its low level; the other output meanwhile is at the low level for the predetermined period and switches back to a high level. The predetermined period is made long enough so that the first high level output connected to the "fire" input is maintained until the storage capacitor 57 has completely fired, at which time the one-shot multivibrator automatically switches to apply the high level signal to the "charge" input to start recharging of the storage capacitor 57. Many other compatible switching schemes for providing the "charge" and "fire" triggering signals will suggest themselves to those skilled in the art.

While there has been described above, and illustrated in the drawings, an improved circuit for providing actuating current pulses to the pinch roller actuator of a tape transport system, it will be appreciated that a number of other alternatives may be employed within the scope of the invention. Accordingly, the invention should be considered to include all modifications and variations falling within the scope of the appended claims.

What is claimed is:

1. An electrical circuit for providing current pulses from a source to the actuating coil of a pinch roller actuator of a tape transport system, comprising a storage capacitor, means for charging the storage capacitor from the source including an inductor and a unidirectional device connected in series between said source and the storage capacitor, said inductor having an inductance value relative to the capacitance value of the storage capacitor for sustaining the flow of charging current through said unidirectional device for an interval after the storage capacitor has been charged to a voltage equal to that of said source, a second unidirectional device connected between the capacitor and the actuating coil to pass the current from the capacitor to the actuating coil to actuate the pinch roller actuator, and switch means for selectively connecting the source through the inductor in the first unidirectional device to charge the storage capacitor during a first interval and completing the circuit between the charged storage capacitor and the actuating coil through the second unidirectional device during a second interval to operate the pinch roller actuator.

2. In a pinch roller actuator system of a magnetic tape transport, having separate solenoid type windings for moving an actuator armature from one stable position to another, a firing circuit for providing current pulses to the solenoid type windings comprising a separate storage capacitor for providing current to each of the solenoid type windings, a source of electric current for providing current to charge said storage capacitors, a charging circuit including an inductor and a first unidirectional device connected between said source and each said storage capacitor, first switch means for providing current from said source through the inductor and the first unidirectional device to charge said storage capacitor, said inductor having an inductance value relative to the capacitance value of said storage capacitor for sustaining the flow of charging current through said first unidirectional device for an interval after said storage capacitor has been charged to a voltage equalling that of said source, a second unidirectional device connected between said storage capacitor and the solenoid type windings, and second switch means for selectively providing current from the storage capacitor when charged through the second unidirectional device to the solenoid type windings.

3. A circuit for providing a source of current to the actuating coil of a pinch roller actuator of a tape transport system comprising a source of electrical current, a storage capacitor, an inductor, and a unidirectional device connected in series between said source and said storage capacitor, switch means responsive to external signals for connecting the source through said inductor and said unidirectional device to the storage capacitor said inductor having an inductance value relative to the capacitance value of the storage capacitor for limiting the maximum amplitude of the current flow from the source and maintaining the flow of charging current while the storage capacitor is charged to a final voltage value approximately twice the voltage value of the source, and means for selectively coupling the charged storage capacitor to the actuating coil of the pinch roller actuator for discharging the storage capacitor through said actuating coil.

4. A circuit for providing actuating current pulses to a pinch roller actuator system comprising a storage capacitor, a power supply, an inductive element coupled between said storage capacitor and the power supply, means for providing a unidirectional flow of current at selected times from said power supply through the inductive element to charge said storage capacitor, said inductive element having an inductance value relative to the capacitive value of said storage capacitor for maintaining the unidirectional flow of current for an interval during which the storage capacitor is charged to a final voltage substantially exceeding the voltage value of said source, an actuating coil coupled to operate the pinch roller actuator system, and means for obtaining a flow of current from the storage capacitor to the actuating coil in one direction only to thereby discharge the storage capacitor through the operating coil.

5. A circuit for providing current pulses for operating a pinch roller actuator system comprising a storage capacitor, a charging circuit connected to the storage capacitor including a source of charging current a current limiting inductive element, a unidirectional circuit means and switch means for selectively delivering current through the inductive element and the unidirectional element to charge said storage capacitor, said inductive element having an inductance value relative to the capacitance of said storage capacitor for maintaining the flow of charging current through the unidirectional element for an interval after said storage capacitor has been charged to a voltage value equal to the voltage of said current source and a discharging circuit comprising an actuating coil for imparting a magnetic force to operate the actuator system, a unidirectional device and means for selectively closing a circuit from the storage capacitor through the unidirectional device and the actuating coil to deliver a pulse of current from the storage capacitor.

6. A circuit for deriving current for use in actuating a pinch roller actuating system comprising a storage capacitor, an electrical power supply circuit, first and second means for passing current unidirectionally after receipt of a control signal, an inductive element connected in series with said first means for passing current from said electrical power supply to charge said storage capacitor upon receipt of a first control signal, said inductive element having an inductance value relative to the capacitance of said storage capacitor for sustaining the flow of charging current through said first means to charge said storage capacitor to a final voltage exceeding the voltage of said electrical power supply circuit, said second means being connected between the storage capacitor and the pinch roller actuator for passing current therebetween upon receipt of a second control signal, and means connected to said first and second means for providing said first and second control signals thereto in accordance with the desired operation of the magnetic tape system.

7. The circuit of claim 6 wherein said first and second means are silicon-controlled rectifiers having anode, cathode and control electrodes, said control signals being applied to the control electrode and said anode and cathode electrodes being coupled to pass current in one direction only from said cathode to said anode electrode.

References Cited by the Examiner

UNITED STATES PATENTS

| | | | |
|---|---|---|---|
| 2,878,431 | 3/59 | Hull | 317—151 |
| 2,907,929 | 10/59 | Lawson | 317—151 X |
| 2,977,536 | 3/61 | Hindel | 320—1 X |
| 3,024,406 | 3/62 | Porterfield | 320—1 |
| 3,033,971 | 5/62 | Pfau | 320—1 |
| 3,047,807 | 7/62 | Langan | 320—1 X |
| 3,074,008 | 1/63 | McPhail et al. | 323—22 |
| 3,106,667 | 10/63 | Winchel | 317—151 X |
| 3,147,419 | 9/64 | Cope. | |

SAMUEL BERNSTEIN, *Primary Examiner.*